United States Patent [19]
Hildebrandt

[11] 3,836,172
[45] Sept. 17, 1974

[54] SAFETY BELT FASTENING
[75] Inventor: Christian Hildebrandt, Wilsche, Germany
[73] Assignee: Volkswagenwerk Aktiengesellschaft, Wolfsburg, Germany
[22] Filed: Oct. 3, 1973
[21] Appl. No.: 403,268

[30] Foreign Application Priority Data
Oct. 6, 1972 Germany.............................. 2249005

[52] U.S. Cl............................................ 280/150 SB
[51] Int. Cl............................................ B60r 21/10
[58] Field of Search................... 280/150 SB, 150 B

[56] References Cited
UNITED STATES PATENTS
2,665,143  1/1954  Rasmussen................... 280/150 SB Primary Examiner—David Schonberg
Assistant Examiner—Michael J. Forman
Attorney, Agent, or Firm—Brumbaugh, Graves, Donohue & Raymond

[57] ABSTRACT

A safety belt fastening for the end of a motor vehicle safety belt which has one of its ends attached to a portion of the vehicle door. The end of the safety belt is attached to a fitting which is securely attached by means of a locking bolt to a portion of the frame member of the door. The locking bolt has a head portion which is brought into force transmitting relation to a portion of a holding plate mounted in the door column of the vehicle body when the door is closed.

7 Claims, 3 Drawing Figures

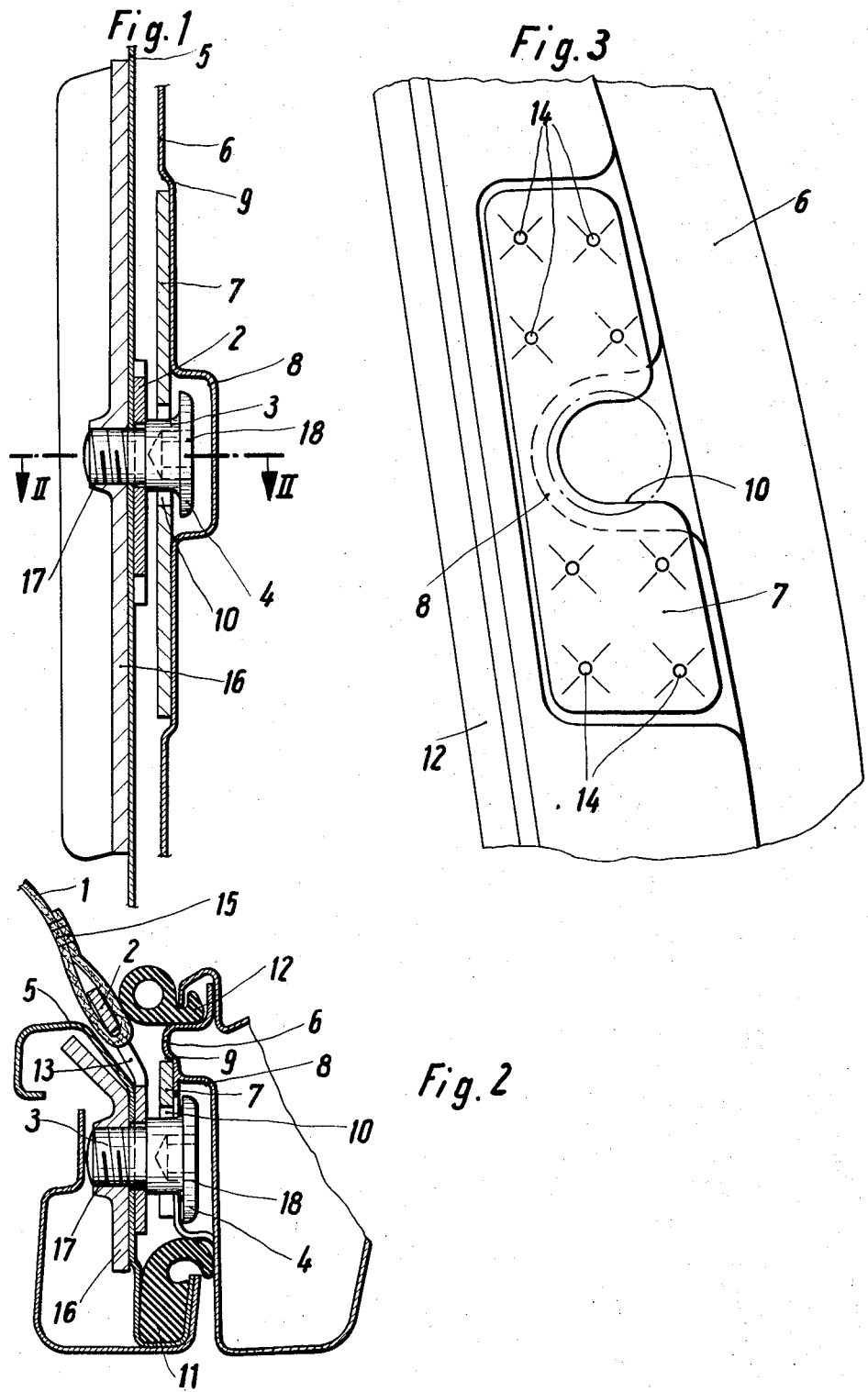

SAFETY BELT FASTENING

BACKGROUND OF THE INVENTION

1. Field of the Invention

The invention concerns a device for fastening a motor vehicle safety belt which is attached at one end to a portion of a vehicle door.

2. Description of the Prior Art

Safety belts which are attached at one end to a portion of the vehicle door adjacent the seat occupied by the passenger, and which are fastened by closing the door, are known. These belts do not require any separate manual action by the passenger in order to be locked. When the door is opened, the safety belt of this type is moved out of its restraining position thereby providing a person with largely unobstructed access to and egress from the vehicle seat. A spring-loaded belt winding spool is generally provided with this type of safety belt to allow for a controlled increase in the length of the safety belt when the door is opened. A locking device associated with the winding spool prevents the unwinding of the safety belt upon abrupt movements of the passenger, thereby insuring that the safety belt will maintain the passenger in the vehicle seat in the event of an accident.

Large forces have to be absorbed by any type of safety belt and its associated fastening with the vehicle in the event of an accident. The type of safety belt described above which is fastened at one end to the door of a vehicle causes problems since the doors of the vehicle are not designed to absorb the large forces which are impressed upon the belt in the event of an accident. Introduction into the vehicle door of these forces can quite easily deform the vehicle door and can in some cases even prevent them from being opened after an accident has occurred.

Therefore, it is the purpose of this invention to provide a fastening for a safety belt having one of its ends attached to a portion of the door wherein the fastening facilitates the rapid and safe transmission of the forces exerted on the belt directly to the frame of the vehicle without having the forces impressed on more easily deformable portions of the door.

SUMMARY OF THE INVENTION

The invention comprises an apparatus for coupling a safety belt, of the type adapted to be fastened at one end to a door of a motor vehicle, in force-transmitting relation to the door column structure associated with said door of the vehicle. It comprises a locking bolt means mounted on the frame of the door and having a head portion facing the opposing portion of the door structure, means for coupling an end of the safety belt to the locking bolt means, and means mounted on the opposing portion of the door column structure for receiving the head portion in force-transmitting relation when the door of the vehicle is closed and for allowing movement of the head portion out of force-transmitting relation when the door is opened, whereby forces imposed on the safety belt during use may be transmitted to the door column structure of the vehicle.

BRIEF DESCRIPTION OF THE DRAWINGS

The invention may be further understood by referring to the drawings which form a portion of this specification wherein:

FIG. 1 shows a vertical longitudinal section through the fastening device of the present invention;

FIG. 2 is a horizontal cross-section through the fastening device according to lines II—II in FIG. 1; and FIG. 3 is a view of the holding plate which is mounted on the door column.

DESCRIPTION OF A PREFERRED EMBODIMENT OF THE INVENTION

FIG. 2 shows an end of a safety belt 1 which is positioned in an eye 13 of a belt fitting 2 and which is secured in loop form at 15 in a known manner. The belt fitting 2 is fastened to the vehicle door by means of a locking bolt 3 anchored on the front surface of the door frame 5 which consists of metal plate. The belt fitting 2 pivots on the locking bolt 3 which is screwed into a threaded bore 17 in a reinforcement plate 16 attached behind the surface of the door frame structure 5 by a suitable means, e.g., by welding. For ease of assembly and disassembly the locking bolt 3 is provided with a hexagonal recess 18 for receipt of a suitable tool.

In order to prevent the belt fitting 2 and the safety belt 1 from interfering with the closing of the vehicle door, a preferred embodiment of the belt fitting, as shown in FIG. 2, is bent back, and the outer contour of the door frame 5 is also set back to leave room for the fitting 2.

The locking bolt 3 is provided with a disk-like head portion 4 which, when the vehicle door is closed, is moved behind a holding plate 7 which is mounted in the door column 6 of the vehicle frame. The holding plate 7 is inserted into the door column 6 of the vehicle frame, which also consists of a metal plate structure, in a recess 9 by welding 14 in such a manner that it lies substantially flush with the outer surface of the door column. In order to accommodate the head portion 4 of the locking bolt 3, the door column 6 is provided opposite the central portion of the holding plate 7 with a peripheral recess 8 which opens toward the outside of the vehicle. The holding plate 7 at this point is provided with an outardly opening, approximately semicircular cut-out 10, as best seen in FIG. 3, to accommodate the central portion of the locking bolt 3. Reference numerals 11 and 12 designate the usual seals which seal off the gap existing between the door frame 5 and the door column 6.

As clearly shown in the drawings, the head portion 4 of the locking bolt 3 upon closing of the vehicle door is brought into recess 8 in the door column 6 and behind the rear surface of the holding plate 7 which is fixed in the recess 9. This construction allows forces exerted on the belt during an accident to be transmitted directly to the door column structure of the vehicle frame without having them introduced into less resistant areas of the door and the door lock. In this manner, a safe and highly stressable fastening of the safety belt to the vehicle door is obtained while at the same time the danger of deformation of the vehicle door or door lock is largely excluded. The use of a large holding plate 7 on the door column 6 and of a large reinforcement plate 16 on the door frame 5 insures a very favorable distribution of the force exerted on the belt.

I claim:

1. Apparatus for coupling a safety belt, of the type adapted to be fastened at one end to a frame of a door of a motor vehicle, in force-transmitted relation to the door column structure associated with said door of the vehicle, comprising:
- a locking bolt means mounted on the frame of said door and having a head portion facing the opposing portion of said door column structure;
- means for coupling an end of the safety belt to said locking bolt means; and
- means mounted on said opposing portion of said door column structure for receiving said head portion in force-transmitting relation when said door is closed and for allowing movement of said head portion out of said force-transmitting relation when the door is opened, whereby forces imposed on the safety belt during use may be transmitted to the door column structure of the vehicle.

2. Apparatus as claimed in claim 1 wherein the head portion of the locking bolt means is disk-shaped.

3. Apparatus as claimed in claim 1 wherein said means mounted on the opposing portion of the door column structure comprises a holding plate secured to the door structure column in substantially flush relation to the surface of said door column structure.

4. Apparatus as claimed in claim 3 wherein the holding plate has a cut-out to accomodate the central portion of the locking bolt.

5. Apparatus as claimed in claim 4, wherein the cut-out portion is semicircular in shape.

6. Apparatus as claimed in claim 1, wherein the means for coupling the safety belt comprises a fitting pivotally connected to the locking bolt means.

7. Apparatus as claimed in claim 1, wherein the locking bolt means is detachably secured to a reinforcement plate attached to a portion of the door frame.

* * * * *